(12) United States Patent
Brown et al.

(10) Patent No.: US 7,277,867 B1
(45) Date of Patent: *Oct. 2, 2007

(54) METHOD FOR CONDUCTING AN ON-LINE BIDDING SESSION WITH BID POOLING

(75) Inventors: Stephen J. Brown, Woodside, CA (US); David W. Brown, Bingen, WA (US)

(73) Assignee: Health Hero Network, Inc., Redwood City, CA (US)

( * ) Notice: Subject to any disclaimer, the term of this patent is extended or adjusted under 35 U.S.C. 154(b) by 1159 days.

This patent is subject to a terminal disclaimer.

(21) Appl. No.: 09/653,664

(22) Filed: Sep. 1, 2000

Related U.S. Application Data (63) Continuation of application No. 09/304,446, filed on May 3, 1999, now Pat. No. 6,167,386, which is a continuation of application No. 09/092,604, filed on Jun. 5, 1998, now Pat. No. 6,023,686, which is a continuation-in-part of application No. 08/603,131, filed on Feb. 20, 1996, now Pat. No. 5,794,219, application No. 09/653,664, which is a continuation-in-part of application No. 09/625,080, filed on Jul. 25, 2000, now abandoned, which is a continuation of application No. 09/160,970, filed on Sep. 25, 1998, now Pat. No. 6,240,393.

(51) Int. Cl.
*G06Q 40/00* (2006.01)

(52) U.S. Cl. .......................... 705/37; 705/26

(58) Field of Classification Search .............. 705/1, 705/26, 27, 35–44; 709/217, 219, 227; 340/825.26, 340/825.27, 825.3
See application file for complete search history.

(56) References Cited

U.S. PATENT DOCUMENTS

| 3,581,072 | A | | 5/1971 | Nymeyer |
| 4,412,287 | A | | 10/1983 | Braddock, III |
| 4,789,928 | A | | 12/1988 | Fujisaki |
| 4,799,156 | A | | 1/1989 | Shavit et al. |
| 4,903,201 | A | | 2/1990 | Wagner |
| 5,077,665 | A | | 12/1991 | Silverman et al. |
| 5,243,515 | A | * | 9/1993 | Lee .............................. 705/37 |
| 5,593,349 | A | | 1/1997 | Miguel et al. |

(Continued)

OTHER PUBLICATIONS

"Putting the Lot on the Net," Antique Collector, vol. 66, Issue 9, p. 26, Downloaded from Corporate Resource Net, Nov./Dec. 1995.

(Continued)

*Primary Examiner*—Ronald Laneau (57) ABSTRACT

The invention presents a method for conducting an on-line bidding session to accumulate a collective bid for a property. The bidding session is conducted over a computer network that includes a central computer, a number of remote computers, and communication lines connecting the remote computers to the central computer. According to the method, at least one bidding group is registered in the central computer. The bidding group can be an association, institution, or group of investors formed for the purpose of bidding together for the property. The bidding group has a total bid for the property which is tracked in the central computer. The central computer receives bids entered from the remote computers by members of the bidding group. Each bid includes an individual bid amount which is contributed to the total bid of the group to accumulate the collective bid for the property.

34 Claims, 8 Drawing Sheets

U.S. PATENT DOCUMENTS

| | | | | |
|---|---|---|---|---|
| 5,640,569 | A | | 6/1997 | Miller et al. |
| 5,654,968 | A | * | 8/1997 | Smiroldo ................... 370/443 |
| 5,675,635 | A | | 10/1997 | Vos et al. |
| 5,689,652 | A | | 11/1997 | Lupien et al. |
| 5,794,219 | A | * | 8/1998 | Brown ....................... 705/37 |
| 5,796,393 | A | | 8/1998 | Vos et al. |
| 5,835,896 | A | | 11/1998 | Fisher et al. |
| 5,875,432 | A | | 2/1999 | Sehr |
| 6,023,686 | A | * | 2/2000 | Brown ....................... 705/37 |
| 6,112,188 | A | * | 8/2000 | Hartnett ................... 705/36 R |
| 6,167,386 | A | * | 12/2000 | Brown ....................... 705/37 |
| 6,240,393 | B1 | | 5/2001 | Brown |
| 6,847,939 | B1 | * | 1/2005 | Shemesh ..................... 705/26 |

OTHER PUBLICATIONS

Luebke, C., "Barrett-Jackson Auction Turns High-Tech," Business Journal, vol. 6, Issue 12, pp. 11, Jan. 19, 1996.

Lachnit, Carroll, "Hawkin's Online Auction," Photo District News, vol. 16, Issue 1, p. 18, Jan. 1996.

Franklin; "Proposed Auction Rules for PCS: The FCC Plans to Use Competitive Bidding, but Exact Procedures are Undefined;" *Cellular Business*; v10 n13; p. 18(2); Dec. 1993; Dialog: File 148, Acc# 06787310.

O'Donnell; "Alan's At It Again;" *Bond Buyer*, v309 n29448; p. 1(3); Jul. 21, 1994; Dialog: File 148, Acc# 07478152.

Dialog Abstract: File 610, Acc# 0489267; "Onsale: Onsale Brings Thrill of Auctions and Bargain Hunting Online; Unique Internet retail service debuts with week-long charity auction for The Computer Museum in Boston;" May 24, 1995.

"Onsale Joins Fray as Online Shopping Picks Up Speed: Internet Booms;" Computer Reseller News; Jun. 5, 1995; p. 73; Dialog: File 16, Acc# 05649796.

Siegamann; "Nowhere to Go but Up;" PC Week; v12 n42, p. A5(1); Oct. 23, 1995; DIALOG: File 148, Acc# 08222496.

Cathay pacific airways-USA to hold first ever internet cyberauction, Business Wire, Sep. 26, 1996, p961084.

Save the earth artrock auction, http://www.commerce.com-.save_earth. Date of computer printout Dec. 27, 1995.

Auction Web, http://www.ebay.com. Date of computer print-out Dec. 4, 1995.

Results of the world's first on-line auction, http://www.cristies.com. Date of computer printout Dec. 27, 1995.

Edelson, Sharon, Fashion reevaluates flickering fortunes of TV home shopping, WWD, Nov. 8, 1995, v. 170, No. 87, p. 1 (3).

Gordon, Maynard M., Auctions become high tech, Dealer Business, Mar. 1995, V. 29, No. 7, p. 21 (4).

Pitkow et al: "Results from the First World-Wide Web User Survey," Journal of Computer Networks and ISDN Systems (Special Issue), vol. 27, No. 2, May 25, 1994, pp. 1-15, XP002073755 the whole document.

Pitkow et al: "Using the Web as a Survey Tool: Results from the Second WWW User Survey,"60 Computer Networks and ISDN Systems, vol. 27, 1995, pp. 809-822, XP004013183 the whole document.

Patent Abstracts of Japan, vol. 17, No. 255 (P-1539), May 20, 1009 (May 20, 1996) & JP 04 372080 A (Matsushita Electric IND CO LTD), Dec. 25, 1992 abstract.

* cited by examiner

ACCOUNT CREATION FORM

32

BIDDER NAME: ~44 | JOHN SMITH |  54

FINANCIAL ACCOUNT NUMBER: 46 | 5423 6789 8976 4543 |

FINANCIAL ACCOUNT TYPE: 48 | CREDIT CARD |

| SEND ACCOUNT INFORMATION | 52

BIDDER IDENTIFICATION NUMBER WILL BE ASSIGNED IN A NEW ACCOUNT CONFIRMATION MESSAGE  56

*FIG. 3*

NEW ACCOUNT CONFIRMATION MESSAGE

34

BIDDER NAME: 44 | JOHN SMITH | 55

FINANCIAL ACCOUNT NUMBER: 46 | 5423 6789 8976 4543

FINANCIAL ACCOUNT TYPE: 48 | CREDIT CARD

BIDDER ID NUMBER: 50 | 431532

| PLEASE CONFIRM YOUR NEW ACCOUNT INFORMATION WITH YOUR ACCOUNT COMPANY | 58

METHOD FOR CONDUCTING AN ON-LINE BIDDING SESSION WITH BID POOLING

This application is a continuation of U.S. application Ser. No. 09/304,446, filed May 3, 1999, which is now U.S. Pat. No. 6,167,386 which is a continuation of U.S. application Ser. No. 09/092,604, filed Jun. 5, 1998, which is now U.S. Pat. No. 6,023,686, which is a continuation in part of U.S. application Ser. No. 08/603,131, filed Feb. 20, 1996, which is now U.S. Pat. No. 5,794,219. This application is also a continuation in part of U.S. application Ser. No. 09/625,080, filed Jul. 25, 2000, now abandoned, which is a continuation of U.S. application Ser. No. 09/160,970, filed Sep. 25, 1998, which is now U.S. Pat. No. 6,240,393.

FIELD OF THE INVENTION

The present invention relates generally to on-line auctions, and in particular to a method for conducting an on-line bidding session that allows individual bidders to pool their bids in real-time during the bidding session.

BACKGROUND OF THE INVENTION

Auctions provide a popular and exciting marketplace for the buying and selling of property. In particular, auctions are often used to sell highly valued properties such as fine art, collectibles, real estate, and luxury items. Traditionally, participation in these high stakes auctions has been exclusively reserved for the extremely wealthy. Many ordinary individuals who would like to participate in the excitement of a high stakes auction are denied access for two reasons.

The first reason is that individual bidders are usually required to attend an auction in person to place a bid on an item for sale. This requirement limits participation in the auction to those people who live near the auction site or those people who can afford the time and expense to travel to the auction site. The second reason is that bidders are required to have sufficient funds to pay for a sale item should they place the winning bid. Because very few people can afford the price of an expensive property, bidding is limited to extremely wealthy individuals or to organizations who have raised sufficient funds to pay for a winning bid before the bidding session has begun. Both of these restrictions must be overcome before participation in high stakes auctions can become more widespread.

Many attempts have been made to solve the first problem, gaining bid access to an auction without having to be physically present at an auction site. For example, U.S. Pat. No. 4,789,928 issued to Fujisaki on Dec. 6, 1988 describes an auction information processing system which enables individuals spread over a wide area to participate in an on-line auction. The system includes a host computer connected via communication lines to remote terminals. Individual bidders enter bids from the remote terminals and the current highest bid and eventual winning bid are displayed in real-time on the remote terminals.

While this system has the advantage of allowing a large number of bidders to participate in an on-line auction, it has the disadvantage of requiring each bidder to have sufficient funds to cover a winning bid. Thus, this system solves the first problem of gaining remote access to auctions, but it still limits participation to those individuals who can personally afford the entire purchase price of the property for sale.

Another computerized bidding system is disclosed in U.S. Pat. No. 4,903,201 issued to Wagner on Feb. 20, 1990. Wagner describes an automated futures trading exchange in which bids to purchase or offers to sell a particular commodity contract are made by exchange members through remote terminals connected to an exchange computer. The exchange computer matches offer prices and bid prices to complete trading transactions. This system described by Wagner suffers from the same disadvantage of requiring each individual bidder to have sufficient funds to cover a winning bid. Additionally, bidders are limited to exchange members, so that the ordinary public is excluded from participating.

A teleprocessing system used by QVC Incorporated is described in an article entitled "Fashion Re-Evaluates Flickering Fortunes of TV Home Shopping", WWD, Nov. 8, 1995 V170 N87. Shoppers call from their home phones to order items advertised on their television screens. As the orders are received, QVC tallies how many people have bought each particular sale item. QVC then displays the tally for each item on the viewers' television screens in real-time. This interactive television method of buying an item provides easy remote access to a sale and real-time feedback to buyers. Unfortunately, it also requires each home shopper to pay for items individually, so that the sale is limited to relatively low cost items.

Another use of television to sell items is described in an article entitled "Auctions Become High Tech", Dealer Business, March 1995 V29 N7. The article describes an auction system in which an auction company sends a signal via satellite to the televisions of individual car dealers. The dealers view a car for sale on their televisions and bid on the car using a telephone or a remote terminal. Like the previous on-line auction systems, this system requires each bidder to have sufficient money to cover the entire cost of the property for sale.

In addition to the auctions mentioned above, several on-line auctions are now being conducted over the Internet. One such auction is described in an article entitled "Cathay Pacific Airways-USA to Hold First Ever Internet CyberAuction" Business Wire, Sep. 26, 1995 p9261084. The article states that Cathay Pacific is auctioning off fifty business class seats from Los Angeles to Hong Kong. Registered bidders submit concealed bids by electronic mail over a two week bidding session. The fifty highest bidders at the close of the bidding session receive an electronic mail message instructing them on how to purchase tickets. This auction system suffers from the same disadvantage of requiring each bidder to have sufficient funds to pay for a winning bid. Moreover, bid information is not displayed to bidders in real-time.

Similarly, Save the Earth Foundation has an Artrock Auction that is described at their world-wide web site http://www.conmerce.com/save_earth. To participate in the auction, bidders register and submit bids for auction items through the Internet. Bidders are notified by electronic mail when a bid higher than their own is placed on an item. The winning bidder is also contacted by electronic mail at the close of the bidding session. As in the Cathay Pacific auction, the Artrock Auction requires each bidder to have sufficient funds to pay for a winning bid, and bid information is not displayed to the bidders in real-time.

Auction Web also has on-line auctions, as described at their world-wide web site http://www.ebay.com. In this auction system, bidders also register and submit bids through the Internet. Items for sale are graphically displayed on the bidders' screens, in addition to the bid information for each item. Bid information is updated hourly throughout each two week bidding session. Similarly, Christie's International describes "Results of the World's First On-Line Auction" at their world-wide web site http://www.christies-.com. In Christie's auction, bidders register and submit bids in the same manner as the Auction Web auction. Unfortunately, like the previously mentioned on-line auctions, both Auction Web and Christie's require each bidder to have sufficient funds to pay for a winning bid.

Thus, existing on-line auctions require each bidder to have sufficient funds to cover a winning bid, severely restricting the number of people who can participate in a high stakes auction. Additionally, not all of the on-line auctions enable bidders to view bid information in real-time, further limiting the excitement of the auction for those few who can afford to participate.

OBJECTS AND ADVANTAGES OF THE INVENTION

Accordingly, it is an object of the present invention to provide a method for conducting an on-line bidding session that permits individual bidders to pool their bids in order to accumulate a collective bid for a property. It is another object of the invention to greatly increase the number of participants in the bidding session by permitting bidders to contribute amounts of any size to the collective bid. It is a further object of the invention to display updated bid information in real-time for bidders to view from remote computers or terminals.

These and other objects and advantages of the present invention will become more apparent after consideration of the ensuing description and the accompanying drawings.

SUMMARY

The invention presents a method for conducting an on-line bidding session to accumulate a collective bid for a property. The bidding session is conducted over a computer network that includes a central computer, a number of remote computers, and communication lines connecting the remote computers to the central computer. In a preferred embodiment, the central computer is a world-wide web server and the communication lines are Internet lines that connect bidders at their remote computers to the world-wide web server.

The method includes the step of registering at least one bidding group in the central computer. The bidding group can be an association, institution, museum, or group of investors formed purely for the purpose of bidding together for the property. The bidding group has a total bid for the property which is tracked in the central computer. The method also includes the step of receiving in the central computer bids entered from the remote computers by members of the bidding group. Each of the bids includes an individual bid amount to be added to the total bid. The method further includes the step of contributing the individual bid amounts to the total bid to accumulate the collective bid for the property. The total bid is preferably displayed to the bidders on the remote computers and updated in real-time after each bid amount is added to the total bid.

In a particularly advantageous embodiment, the method also includes the step of creating a bidder account for each bidder in an account creation computer networked to the central computer. Each bidder account includes a bidder name, a bidder identification number, and a financial account number, such as the bidder's credit card, checking account, or savings account number. In this embodiment, each bid received in the central computer also includes the name and identification number of the person contributing the bid. At the close of a bidding session, if the bidding group accumulates a total bid sufficient to acquire the property, each individual bid contributed to the total bid is matched by bidder identification number to a corresponding bidder account. The corresponding bidder account is then charged the bid amount contributed, facilitating collection of the total bid of the group.

DETAILED DESCRIPTION

Figure 1:
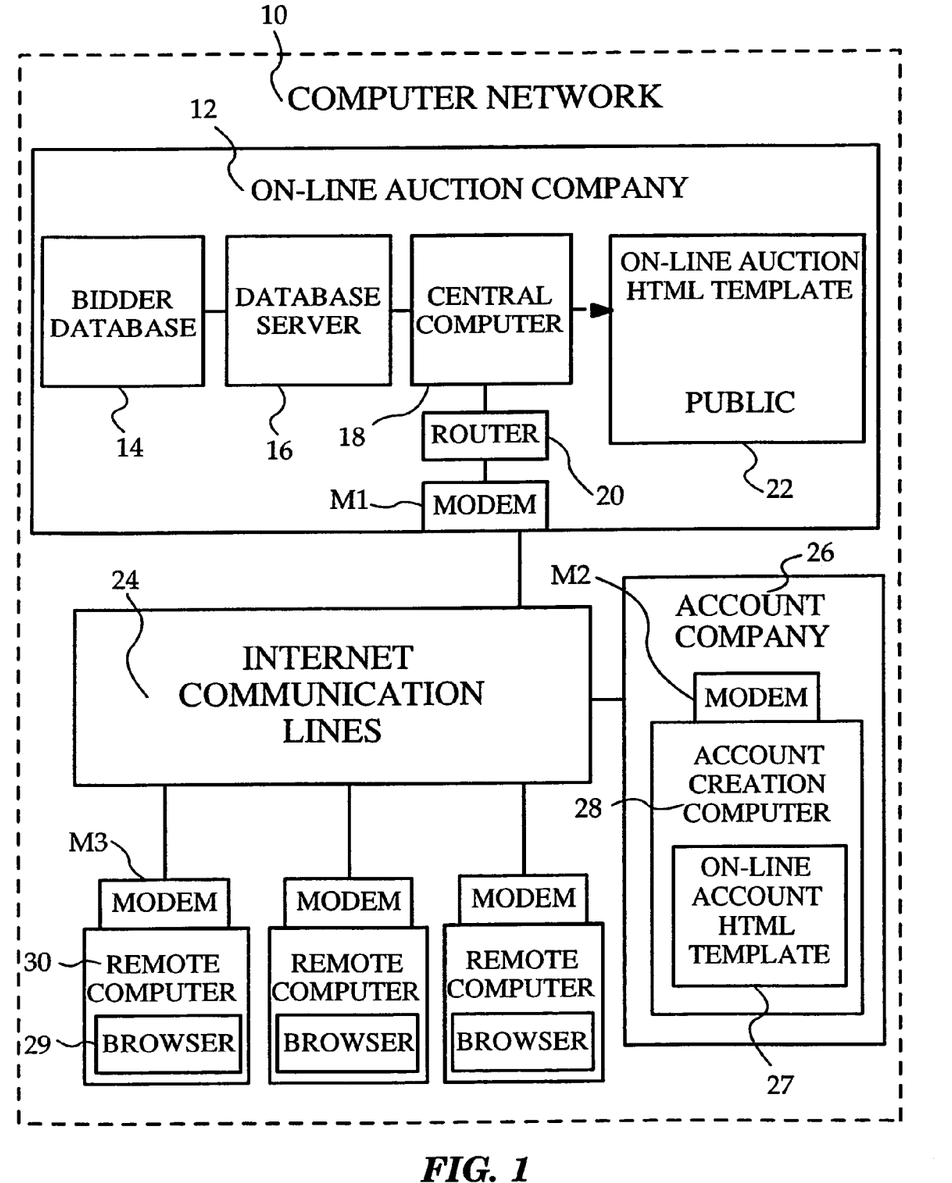
FIG. 1 is a block diagram illustrating a computer network according to a preferred embodiment of the invention.

FIGS. 1-6 illustrate a preferred computer network for conducting an on-line bidding session according to the present invention. Referring to FIG. 1, the computer network 10 includes a central computer 18 of an on-line auction company 12. Central computer 18 is connected to a database server 16 serving a bidder database 14 such that database 14 is accessible to central computer 18. Central computer 18 is further networked to a router and a modem M1. for connecting central computer 18 to communication lines 24. In the preferred embodiment, central computer 18 is a world-wide web server machine and communication lines 24 are Internet lines.

Network 10 further includes an account creation computer 28 of an account company 26. Account company 26 is preferably of the type that provides Internet users with a secure account for performing on-line commerce, such as First Virtual Holdings Incorporated located at 11975 El Camino Real, Suite 300, San Diego, Calif. Account creation computer 28 has a modem M2 for connecting account creation computer 28 to communications lines 24.

Network 10 also includes a number of remote computers 30 each having a modem M3 for connecting the remote computers to communication lines 24. For simplicity of illustration, only three remote computers are illustrated in FIG. 1. It is to be understood, however, that any number of remote computers can be included in the computer network of the present invention. Further, the preferred embodiment utilizes modems and the Internet to network central computer 18, account creation computer 28, and remote computers 30. It will be apparent to one skilled in the art that any type of connections may be used to network the computers. Specific techniques for networking computers are well known.

Each remote computer 30 preferably has an Internet browser 29 for displaying web content in the form of Hyper Text Markup Language (HTML). A suitable browser is Netscape 3.01 available from Netscape Corporation of Mountain View, Calif. Browser 29 allows remote computers 30 to access and display the content of an HTML template 22 residing on central computer 18. HTML template 22 contains the main web pages displayed to on-line bidders on remote computers 30. Similarly, account creation computer 28 has an on-line account HTML template 27 accessible from remote computers 30. In a particularly advantageous embodiment, templates 22 and 27 are Secure HTML templates, and Internet browser 29 is a Secure HTML compliant browser. Using Secure HTML ensures confidentiality for the account and bid transactions that will be described below.

Figure 2:
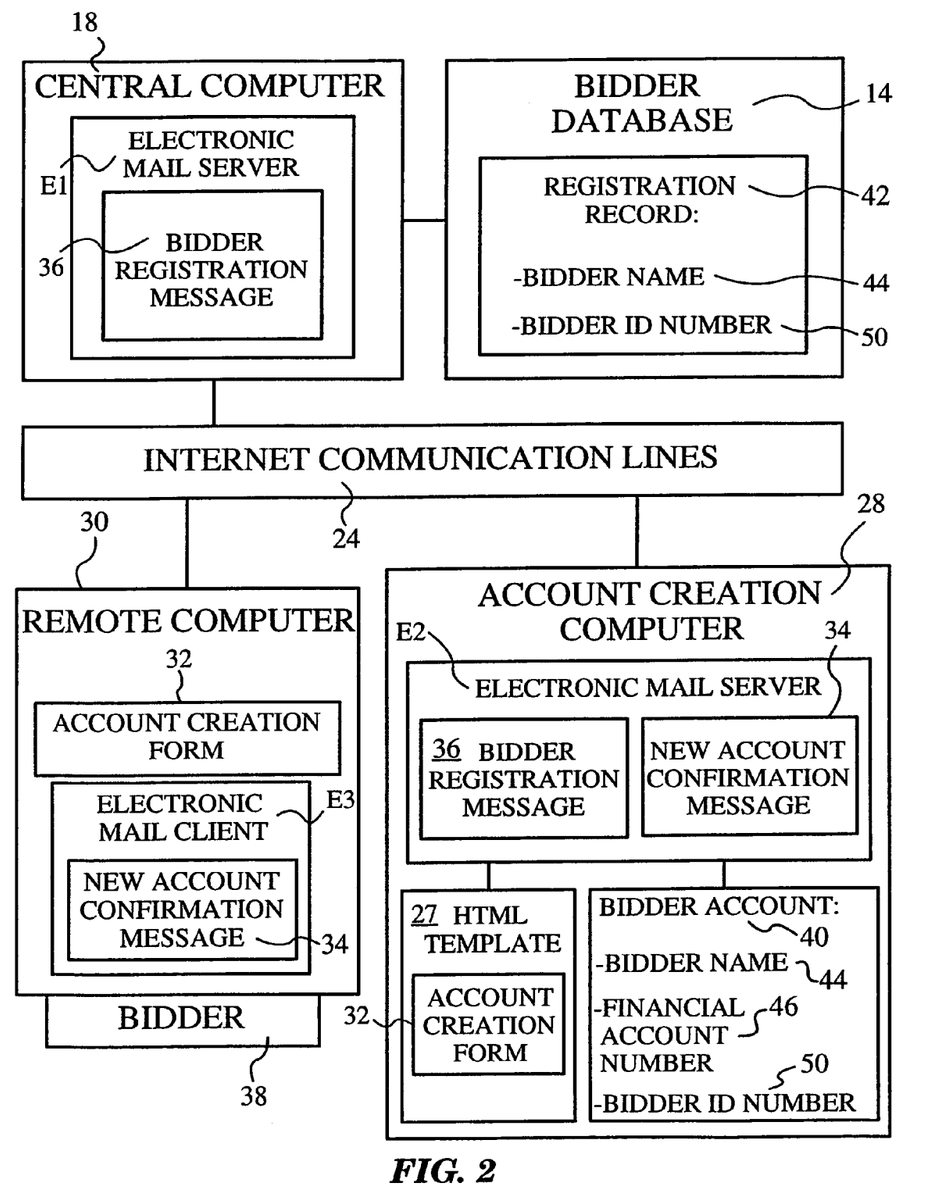
FIG. 2 is a block diagram illustrating the creation of a bidder account according to the preferred embodiment of the invention.

FIG. 2 illustrates the main components of central computer 18, account creation computer 28, and remote computer 30 used in the creation of a bidder account 40 and a registration record 42. A bidder 38 at remote computer 30 accesses on-line account HTML template 27 residing on account creation computer 28. Template 27 contains an account creation form 32 which is displayed to bidder 38 on the screen of remote computer 30.

Figure 3:
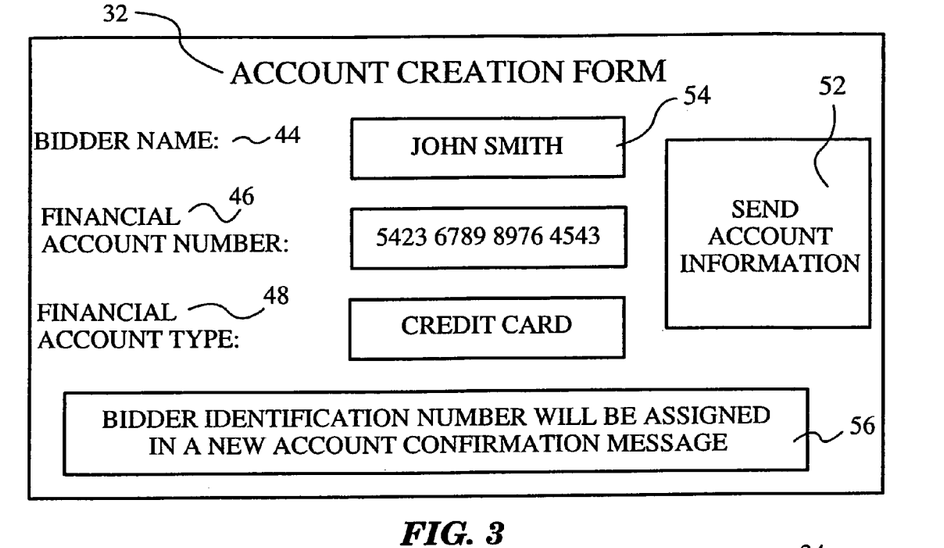
FIG. 3 is a sample account creation form as it appears on the screen of a remote computer of FIG. 1.

FIG. 3 shows a sample account creation form 32. Account creation form 32 has three fields 54 corresponding to a bidder name 44, a financial account number 46, and a financial account type 48. In the preferred embodiment, financial account number 46 is a credit card number corresponding to a credit card account of the bidder. In alternative embodiments, financial account number 46 is the number of a checking account, savings account, or any other account in which the bidder has available cash or credit. Account creation form 32 also contains a note 56 advising the bidder that a bidder identification number will be assigned in a new account confirmation message, as will be described below. Additionally, form 32 contains a button 52 for the bidder to press to send form 32 to account creation computer 28 after completing the form.

Figure 4:
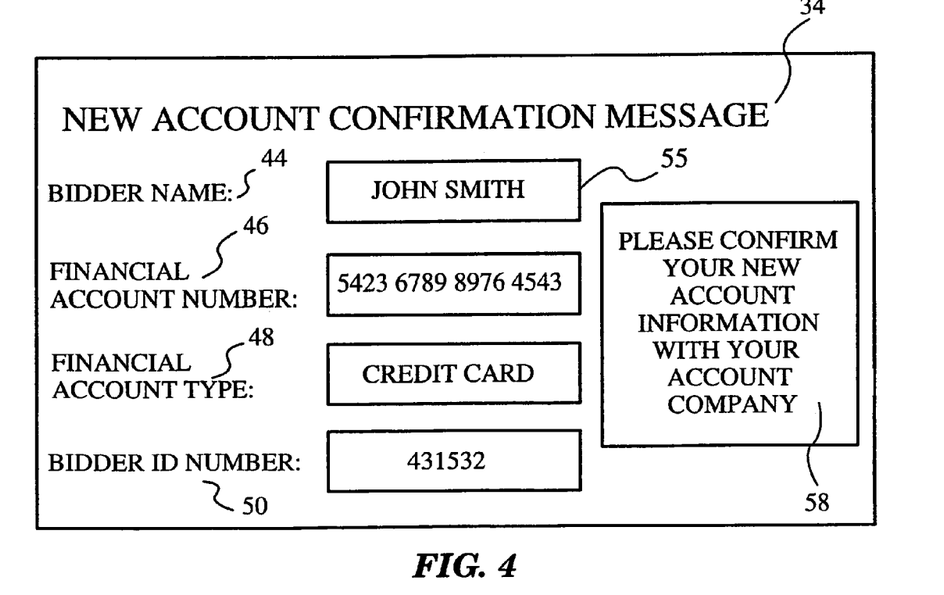
FIG. 4 is a sample confirmation message as it appears on the screen of a remote computer of FIG. 1.

Referring again to FIG. 2, account creation computer 28 has an electronic mail server E2 for sending a new account confirmation message 34 to bidder 38 at remote computer 30. Remote computer 30 has an electronic mail client E3 for receiving and confirming new account confirmation message 34. FIG. 4 illustrates a sample account confirmation message 34. Message 34 includes four fields 55 corresponding to the bidder name 44, financial account number 46, financial account type 48, and bidder identification number 50. Bidder identification number 50 is generated by account creation computer 28 upon receipt of a valid account creation form. Message 34 further contains a note 58 advising the bidder to confirm the new account information with the account company.

Referring again to FIG. 2, account creation computer 28 has storage capability for storing a bidder account 40 that includes the bidder name 44, financial account number 46, and bidder identification number 50. Additionally, mail server E2 is capable of generating a bidder registration message 36 upon receipt of account confirmation from remote computer 30. Registration message 36 includes the bidder name 44 and bidder identification number 50 from the corresponding bidder account. Central computer 18 has an electronic mail server E1 for receiving the registration message 36 from mail server E2. Mail server E1 is linked to bidder database 14 such that a corresponding registration record 42 is created in bidder database 14 upon receipt of registration message 36. Registration record 42 includes the bidder name 44 and bidder identification number 50.

Figure 5:
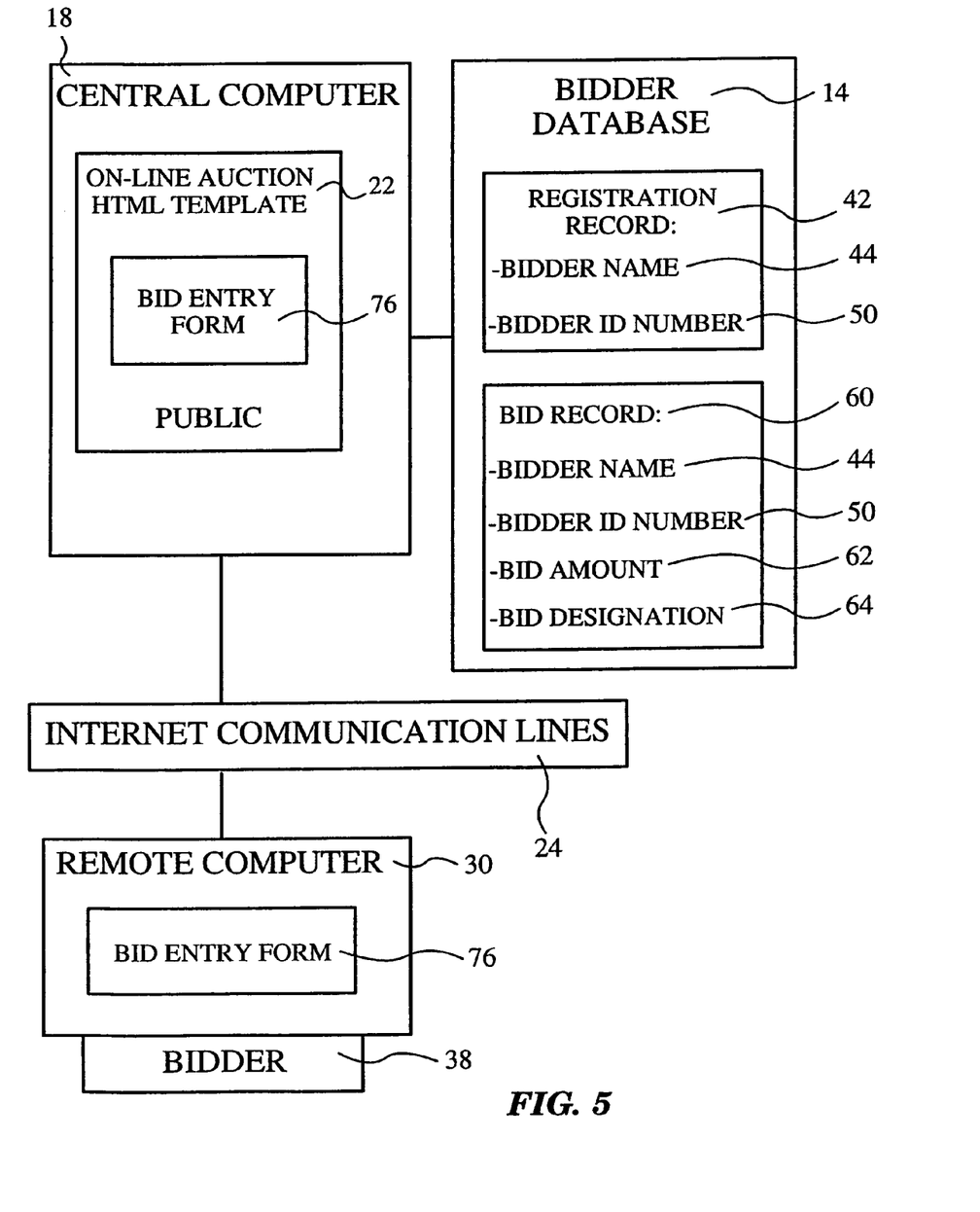
FIG. 5 is a block diagram illustrating the processing of a bid according to the preferred embodiment of the invention.

FIG. 5 illustrates the main components of central computer 18, bidder database 14, and remote computer 30 used to submit and record bids in the on-line bidding session. The HTML template 22 residing on central computer 18 contains a bid entry form 76. Bid entry form 76 is displayed on the screen of remote computer 30 when bidder 38 accesses HTML template 22 through communication lines 24.

Figure 6:
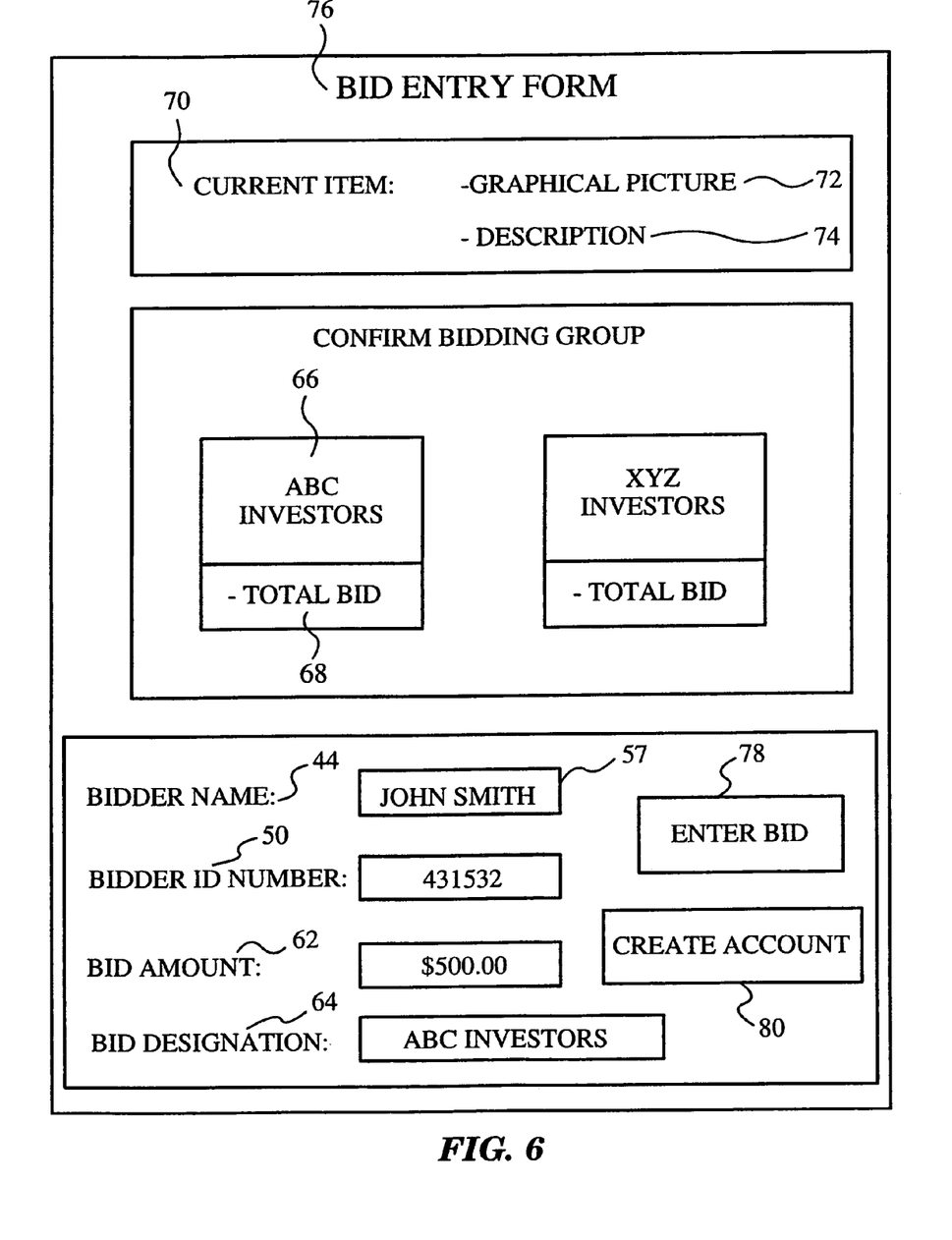
FIG. 6 is a sample bid entry form as it appears on the screen of a remote computer of FIG. 1.

FIG. 6 illustrates a sample bid entry form 76. Form 76 preferably includes a block 70 showing a graphical picture 72 and/or a description 74 of a property for sale. Bid entry form 76 also lists one or more bidding groups 66 with each bidding group having a total bid 68 for the property. Although two bidding groups are illustrated in FIG. 6, it is to be understood that the method for conducting an on-line bidding session according to the present invention may be practiced with only one bidding group or with any number of bidding groups. In any case, each bidding group has a total bid for the property.

Form 76 further includes four fields 57 corresponding to the bidder name 44, bidder identification number 50, bid amount 62, and bid designation 64. Bid designation 64 indicates the bidding group for which the bid is intended, and bid amount 62 is the amount that the bidder desires to contribute to the total bid of the designated group. Form 76 additionally includes an enter bid button 78 and a create account button 80. Button 78 is for bidder 38 to press to submit bid entry form 76 to central computer 18. Create account button 80 is preferably a link button for bidder 38 to press to connect remote computer 30 to on-line account HTML template 27 so that the bidder can create a bidder account.

Referring again to FIG. 5, central computer 18 is linked to database 14 such that central computer 18 can query registration records 42 stored in database 14. This ensures that when central computer 18 receives a bid entry form, the central computer can verify that the bidder name 44 and/or bidder identification number 50 match an existing registration record 42 in database 14. Central computer 18 and database 14 are further linked such that central computer 18 can store a bid record 60 in database 14. Bid record 60 includes the bidder name 44, bidder identification number 50, bid amount 62, and bid designation 64 received in the bid entry form.

Figure 7:
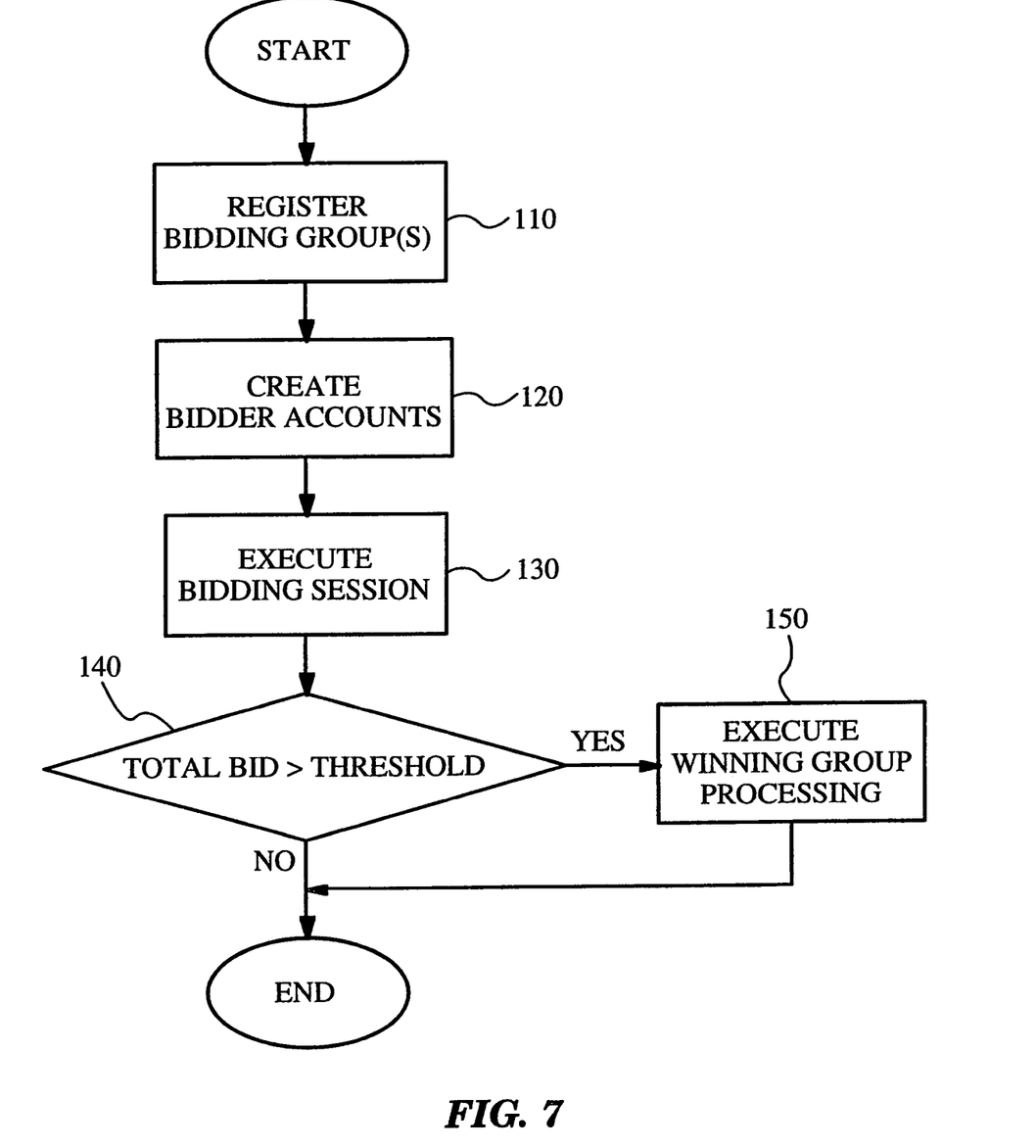
FIG. 7 is a flow chart illustrating a method for conducting an on-line bidding session according to the preferred embodiment of the invention.
Figure 8:
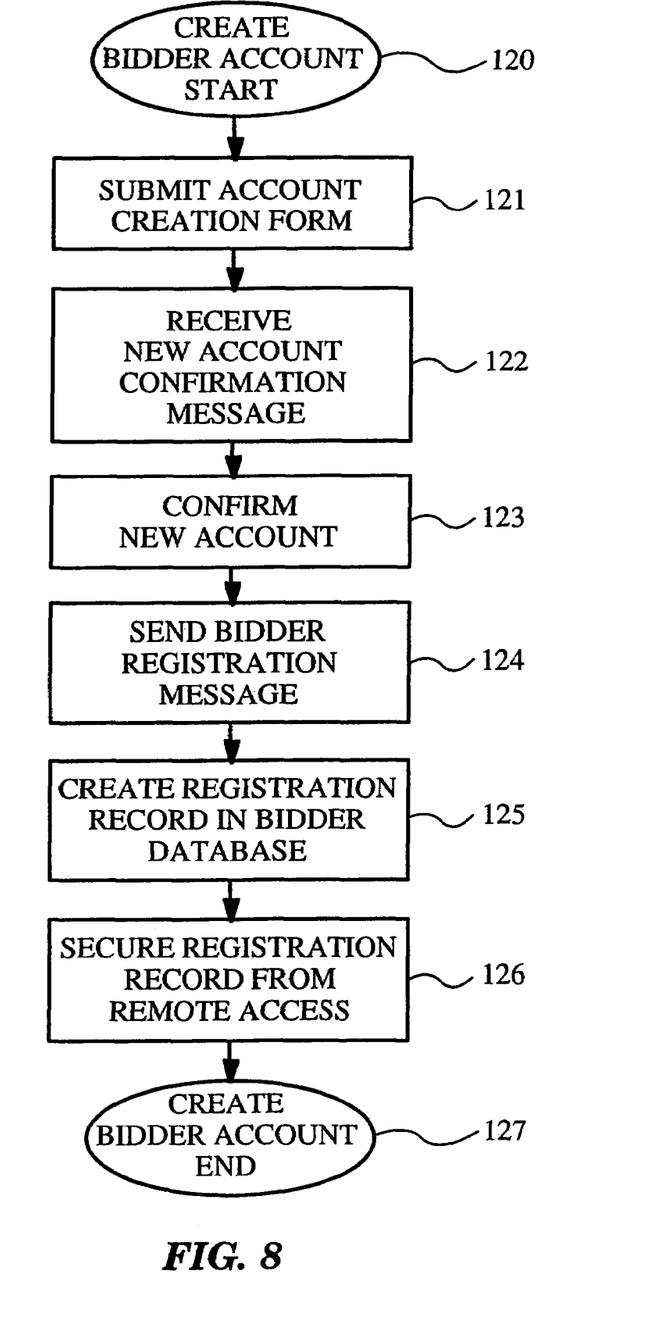
FIG. 8 is a flow chart illustrating the creation of a bidder account (step 120 in FIG. 7).

The operation of the preferred embodiment is illustrated in FIGS. 1–10. FIG. 7 is a flow chart illustrating the overall flow a preferred method for conducting an on-line bidding session according to the present invention. The bidding session is conducted to accumulate a collective bid for a property. For example, and not by way of limitation, the bidding session may be conducted by an investment bank during a corporate takeover to accumulate a collective bid from small investors in order to purchase a company. Of course, a company is just one example of a property for which a collective bid may be accumulated. It will be apparent from this description that the method of the present invention may be used to accumulate a collective bid for any type of property. Moreover, there may be only one bidding group accumulating a single collective bid for the property or multiple bidding groups, with each bidding group accumulating a respective collective bid.

To start the bidding session, company 12 preferably receives a graphical picture and/or description of the property, as well as the names of bidding group(s) wishing to participate. Next, in step 110, company 12 registers at least one bidding group in central computer 18. To register the bidding group, company 12 inserts the name of the bidding group into bid entry form 76 of HTML template 22. Company 12 also preferably inserts into bid entry form 76 the graphical picture and/or description of the property. Next, bidders connect their remote computers 30 to central computer 18 to access bid entry form 76. When the bidders access bid entry form 76, the bidding groups 66 and total bids 68 are displayed on their remote computers, as shown in FIG. 6.

Next, each bidder creates his or her own bidder account 40 in account creation computer 28. The creation of bidder accounts is generally indicated as step 120 in FIG. 7 and detailed in steps 120–127 of FIG. 8. To start the creation of a bidder account, step 120 in FIG. 8, a bidder presses create account button 80 of bid entry form 76. Pressing create account button 80 causes browser 29 to connect remote computer 30 to account creation form 32 contained in HTML template 27. The bidder fills in three fields 54 of account creation form 32 with their name 44, financial account number 46, and financial account type 48, as shown in FIG. 3. The bidder then presses button 52 to send the new account information to computer 28, step 121.

Upon receiving the new account information, account company 26 verifies the bidder name 44, financial account number 46, and financial account type 48 to ensure that they correspond to a valid financial account of the bidder. After successful verification, account creation computer 28 generates identification number 50 for the bidder. Referring again to FIG. 2, account creation computer 28 then generates new account confirmation message 34 on mail server E2 and sends message 34 to mail client E3 of remote computer 30. Bidder 38 then receives new account confirmation message 34 on mail client E3, step 122. Bidder 38 confirms the new account information by pressing button 58 of new account confirmation message 34, step 123.

Upon receiving successful confirmation of the new account information, account creation computer 28 stores bidder account 40 for bidder 38. Account creation computer 28 also generates bidder registration message 36 on mail server E2. Registration message 36 is then sent to mail server E1 of central computer 18, step 124. When central computer 18 receives message 36, central computer 18 creates registration record 42 in database 14, step 125. Registration record 42 is then secured in database 14 from access from remote computers 30, step 126. Securing registration record 42 ensures confidentiality of account information for bidder 38. This ends the account creation process, step 127.

Figure 9:
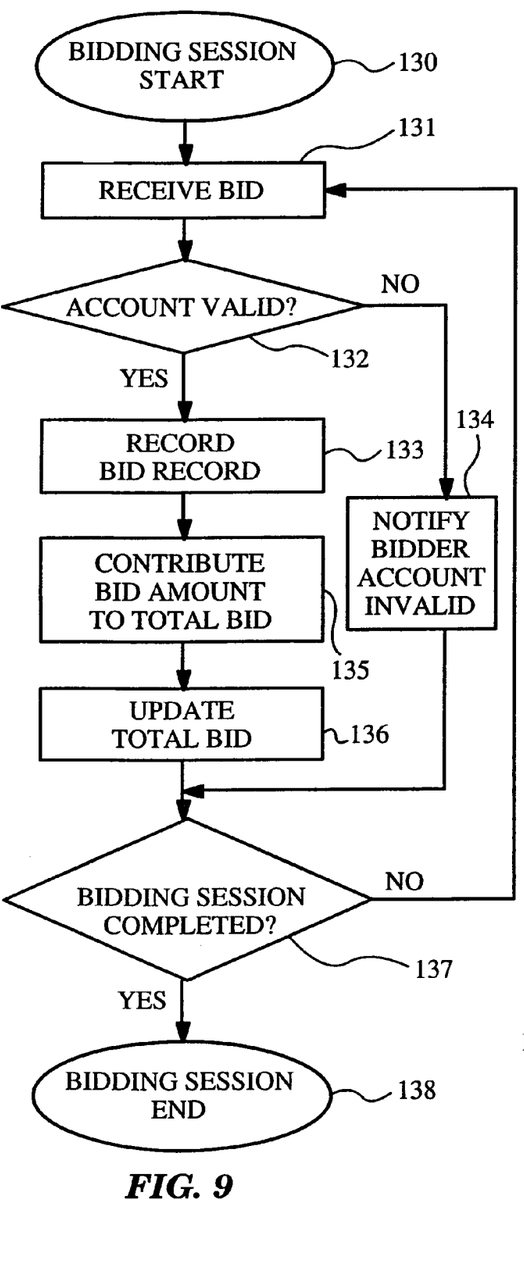
FIG. 9 is a flow chart illustrating the execution of a bidding session (step 130 in FIG. 7).

After registering at least one bidding group in central computer 18, company 12 starts an on-line bidding session for the property, which is generally indicated as step 130 in FIG. 7 and detailed in steps 130–138 in FIG. 9. To submit bids, each bidder completes the four fields 57 of bid entry form 76 with the bidder name 44, identification number 50, bid amount 62, and bid designation 64, as shown in FIG. 6. After completing the bid entry form 76, the bidder presses enter bid button 78 to send the bid information to central computer 18.

Central computer 18 receives bid entry form 76 entered from remote computer 30, step 131. Central computer 18 then queries database 14 to verify that the bidder name 44 and bidder identification number 50 received on the bid entry form match an existing registration record. The query results indicate if the bidder has a valid bidder account, step 132. If the answer is NO, central computer 18 executes step 134, notifying the bidder that he or she does not have a valid bidder account. After notifying the bidder, central computer 18 proceeds to step 137, which will be described below.

If the answer is YES, central computer 18 proceeds to step 133, recording bid record 60 in database 14. Bid record 60 includes the bidder name 44, identification number 50, bid amount 62, and bid designation 64, as shown in FIG. 5. Next, central computer 18 contributes bid amount 62 to the total bid of the designated group indicated by bid designation 64, step 135. After contributing bid amount 62, central computer 18 updates total bids 68 in real-time, step 136. Changes in total bids 68 are dynamically displayed to the bidders by sending commands from HTML template 22 to browsers 29. The commands cause browsers 29 to update themselves so that the bidders may view the updated total bids after each bid amount is contributed. Specific techniques of updating browsers in this manner are well known in the art.

Next, central computer 18 determines if the bidding session is completed, step 137. If the answer is NO, central computer 18 returns to step 131, receiving another bid entry form 76. If the answer is YES, the bidding session ends, step 138. In the preferred embodiment, the bidding session runs for a pre-defined period of time, such as two weeks, so that central computer 18 can determine if the bidding session is completed by using a chronometer (not shown). A time period of two weeks is used for illustrative purposes only. It is to be understood that any duration could be set for the bidding session. In an alternative embodiment, the bidding session runs until bidding activity slows below a pre-defined threshold, such as receiving fewer than three bids per day. Again, this is only an example of a suitable threshold. Any other thresholds for minimum bidding activity could be set.

After the bidding session is completed, it is determined if the total bid of any bidding group exceeds a minimum price or threshold value for the property, step 140 in FIG. 7. For example, if the property is a public company, the threshold value may be set as the stock market price of the company. Alternatively, the owner(s) of the property may set any desired minimum price for which he or she is willing to sell the property. If the total bid of any bidding group exceeds the threshold value, the method preferably includes the additional step of processing a winning group, generally indicated as step 150 in FIG. 7 and detailed as steps 150–156 in FIG. 10.

Figure 10:
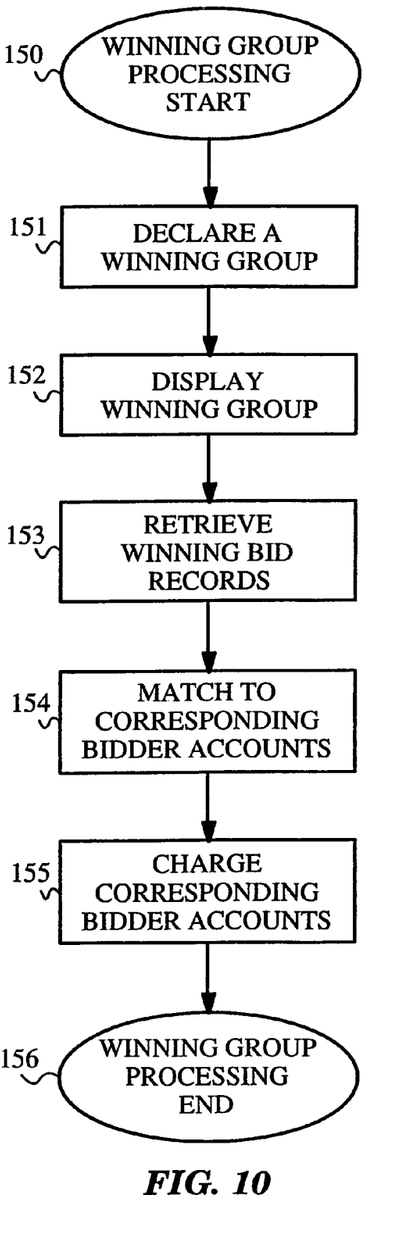
FIG. 10 is a flow chart illustrating the processing of a winning group (step 150 in FIG. 7).

Referring to FIG. 10, company 12 declares the one bidding group having the largest total bid which exceeds the threshold value the winning group, step 151. Next, the winning group is displayed on remote computers 30 for the bidders to view, step 152. Central computer 18 then retrieves winning bid records from database 14, step 153. The winning bid records are those bid records whose bid designation 64 indicates the winning group.

Central computer 18 then sends the winning bid records from mail server E1 to mail server E2 of account company 26. Account company 26 uses bidder-name 44 and/or bidder identification number 50 of each winning bid record to match each winning bid record to a corresponding bidder account, step 154. Next, for each winning bid record, account company 26 charges the bid amount 62 to the financial account number 46 of the corresponding bidder account, step 155. After charging the bid amount for each winning bid record, account company 26 transfers the finds generated to company 12, ending the winning group processing, step 156.

SUMMARY, RAMIFICATIONS, AND SCOPE

Although the above description contains many specificities, these should not be construed as limiting the scope of the invention, but merely as illustrating the presently preferred embodiment. Many other embodiments of the invention are possible. For example, the method for conducting an on-line bidding session according to the present invention need not be used exclusively for accumulating a collective bid for a publicly traded company. The method of the present invention is effective for accumulating a collective bid for any type of property.

In addition, the method described need not be conducted over the Internet using a world-wide web server. The method is effective using any network that allows the transmission of data between bidders at remote locations and a central processor. Similarly, modems are not necessary to network the central computer, account creation computer, and remote computers. Many other methods of connection are possible, as is well known in the art of computer networking.

For simplicity of understanding, the steps of registering bidding groups and creating bidder accounts are presented before the step of commencing a bidding session. This is for illustrative purposes only, as bidding groups may be registered in the central computer after the commencement of a bidding session. For example, bidders wishing to participate but not wishing to bid with any of the current bidding groups may form a new bidding group during the bidding session. In this case, the bid entry form is updated during the bidding session with the name of the new bidding group. Similarly, bidders can create bidder accounts either before or during the bidding session if they desire to contribute to the total bid of a bidding group.

Therefore, the scope of the invention should be determined by the appended claims and their legal equivalents.

What is claimed is:

1. A method of conducting an on-line bidding session, comprising:
   storing registered bidding groups in a computer accessible database coupled to a processor in an auction computer, each of the registered bidding groups including a list of associated bidders;
   receiving bids from bidders on a plurality of remote computers;
   determining a respective bidding group's total bid by accumulating the bids received from bidders included in the respective bidding group's list of associated bidders; and
   storing the determined total bid in the database.

2. The method of claim 1 further comprising creating registration records in the database, each registration record corresponding to a bidder account and including a bidder name, a bidder identification and a financial account number.

3. The method of claim 1, wherein receiving bids from bidders includes receiving the respective bidder name and respective bidder identification from the bidders and the method further comprises:
   verifying, using the processor, whether the respective bidder name and respective identification match a registration record stored in the database; and
   recording a bid record in the database if the respective bidder name and the respective identification have a verified match.

4. The method of claim 3, further comprising:
   determining if the respective bidding group's total bid exceeds a threshold, and if so declaring the bidding group associated with the respective total bid a winning group;
   retrieving the recorded bid records associated with the respective total bid;
   determining at least one bidder account that corresponds to the retrieved bid records; and
   charging the at least one bidder account at least one of the bid amounts included in the bid records.

5. The method of claim 1, further comprising, after determining the total bid associated with the respective bidding group, sending the determined total bid over a computer network to at least one remote computer of at least one bidder associated with the respective bidding group.

6. A method of conducting an auction comprising
   registering a plurality of bidding groups;
   receiving bids from bidders, each bid including a respective bid designation corresponding to one of the plurality of bidding groups;
   associating each bid with the one of the plurality of bidding groups corresponding to the respective bid designation;
   declaring a winning bidding group for the auction from the plurality of bidding groups based upon the bids associated with each bidding group; and
   displaying the winning bidding group for bidders to view.

7. The method of claim 6, wherein each bidding group has a corresponding total bid amount and each bid further includes a respective bid amount that is contributed to the total bid amount for the corresponding bidding group.

8. The method of claim 7, wherein the winning bidding group has the largest total bid amount at the end of a bidding session of the auction.

9. The method of claim 7, further comprising displaying the total bid amount for one or more of the plurality of bidding groups.

10. The method of claim 6, wherein registering the plurality of bidding groups uses at least one central computer coupled to a network.

11. The method of claim 10, wherein the network comprises the Internet.

12. The method of claim 10, wherein the network comprises one or more communication lines.

13. The method of claim 10, further comprising using one or more remote computers coupled to the network to receive bids.

14. The method of claim 6, wherein the auction is on-line.

15. The method of claim 6, further comprising creating one or more bidder accounts.

16. The method of claim 6, wherein associating each bid with at least one of the plurality of bidding groups comprises bid pooling.

17. The method of claim 6, wherein the auction continues until a pre-defined threshold occurs.

18. The method of claim 17, wherein the pre-defined threshold comprises a period of time.

19. The method of claim 17, wherein the pre-defined threshold comprises a minimum bidding activity.

20. A method of conducting an auction, comprising:
   registering a plurality of bidding groups;
   receiving bids from bidders, each bid including a bid designation corresponding to one of the plurality bidding groups;

contributing a respective bid amount in each bid to at least one total bid amount corresponding to at least one of the plurality of bidding groups;

declaring a winning bidding group from the plurality of bidding groups; and notifying the bidders that the winning bidding group has been declared.

21. The method of claim 20, wherein the winning bidding group has the largest total bid amount at the end of the bidding session.

22. The method of claim 20, further comprising using at least one central computer coupled to a network to register the plurality of bidding groups.

23. The method of claim 22, wherein the network comprises the Internet.

24. The method of claim 22, wherein the network comprises one or more communication lines.

25. The method of claim 22, further comprising using one or more remote computers coupled to the network to receive bids.

26. The method of claim 20, wherein the auction is on-line.

27. The method of claim 20, further comprising creating one or more bidder accounts.

28. The method of claim 20, wherein contributing the respective bid amount in each bid to at least one total bid amount corresponding to at least one of the plurality of bidding groups comprises bid pooling.

29. The method of claim 20, further comprising displaying the total bid amount for one or more of the plurality of bidding groups.

30. The method of claim 20, wherein the auction continues until a pre-defined threshold occurs.

31. The methods of claim 30, wherein the pre-defined threshold is a period of time.

32. The method of claim 30, wherein the pre-defined threshold is a minimum bidding activity.

33. The method of claim 20, wherein the winning bidding group is declared based upon a total bid associated with the winning bidding group exceeding a pre-defined threshold.

34. The method of claim 33, wherein the pre-defined threshold comprises a minimum price for a property being auctioned.

* * * * *

UNITED STATES PATENT AND TRADEMARK OFFICE
CERTIFICATE OF CORRECTION

PATENT NO. : 7,277,867 B1
APPLICATION NO. : 09/653664
DATED : October 2, 2007
INVENTOR(S) : Stephen J. Brown et al.

It is certified that error appears in the above-identified patent and that said Letters Patent is hereby corrected as shown below:

Title Page,
Item (56) References Cited
OTHER PUBLICATIONS:
Page 2, "Siegamann;" reference, delete "Siegamann;" and insert
-- Siegmann; --.
Page 2, "Pitkow et al:" reference, delete "60 Computer" and insert
-- Computer --.
Page 2, "Patent Abstracts of Japan" reference, delete "May 20, 1009" and insert
-- May 20, 1996 --.

Column 9,
Claim 3, line 57, delete "claim 1," and insert -- claim 2, --.

Signed and Sealed this

Second Day of December, 2008

JON W. DUDAS
*Director of the United States Patent and Trademark Office*